UNITED STATES PATENT OFFICE.

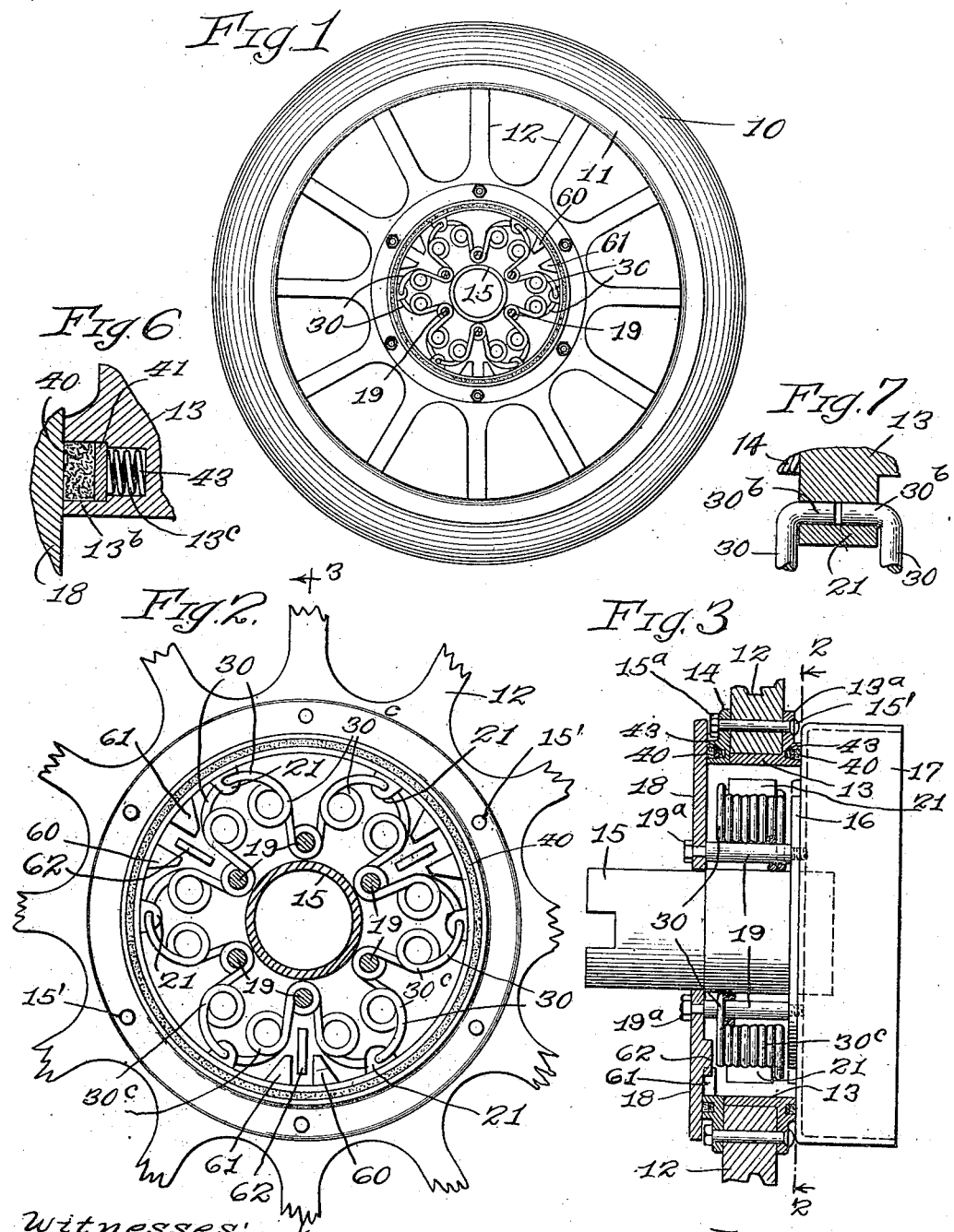

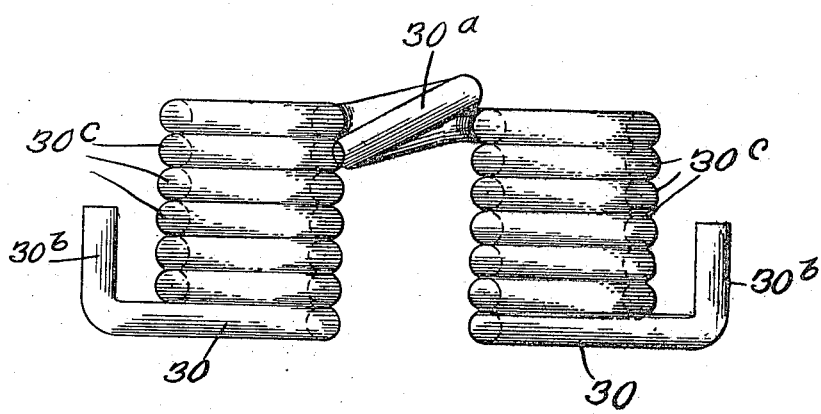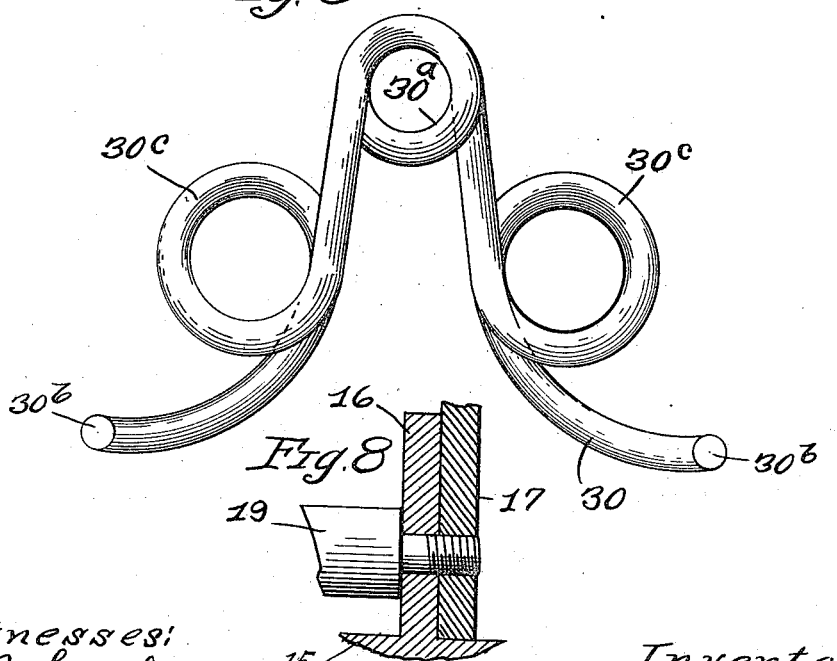

LESLIE HARRINGTON, OF CHICAGO, ILLINOIS, ASSIGNOR TO AMERICAN RESILIENT WHEEL COMPANY, OF CHICAGO, ILLINOIS, A CORPORATION OF DELAWARE.

RESILIENT WHEEL.

1,194,173.

Specification of Letters Patent.

Patented Aug. 8, 1916.

Application filed February 26, 1915. Serial No. 10,727.

*To all whom it may concern:*

Be it known that I, LESLIE HARRINGTON, a citizen of the United States, residing at Chicago, in the county of Cook and State of Illinois, have invented certain new and useful Improvements in Resilient Wheels, of which the following is a specification.

The invention relates to that class of resilient wheels in which the hub of the wheel is cushioned or resiliently mounted in relation to the peripheral portions of the wheel for the purpose of absorbing shocks and jars between the hub of the wheel and its rim or felly.

The primary object of the invention is to provide a resilient construction to be interposed between the wheel hub and peripheral portions of the wheel, which construction is economical to make, and is efficient and durable for the described purpose.

It is a further object of the invention to provide an improved construction of helical spring and connections by which the same may be interposed between the hub of the wheel and the peripheral portion thereof.

It is a further object of the invention to provide, in a resilient wheel of the described character, an improved construction of helical spring and connections by which said spring may be interposed between the hub and the wheel body, and may at the same time be readily removable for the purpose of replacing broken, worn or defective springs, without the aid of a skilled mechanic.

Further objects of the invention will appear from the following description of the same, as shown in the drawing, embodied in the specification, and set forth more particularly in the appended claims.

In the said drawings, Figure 1 is an elevation view of a vehicle wheel to which my invention is applied, one of the floating hub plates being removed to disclose the construction on the interior of the housing which contains the resilient means. Fig. 2 is an enlarged detail view similar to the view shown in Fig. 1 with peripheral portions of the wheel being broken away, and is taken on broken line 2—2 of Fig. 3 looking in the direction indicated by the arrows. Fig. 3 is a sectional view on line 3—3 of Fig. 2. Figs. 4 and 5 are enlarged detail views of the elastic helical springs interposed between the floating hub or axle bushing and the hub housing of the wheel. Fig. 6 is an enlarged fragmental section showing the packing member between the hub and the flange portions of the wheel; Fig. 7 is an enlarged fragmental section showing the connection of the ends of the springs with the lugs of the hub member of the wheel; and Fig. 8 is an enlarged fragmental section showing the connection between one of the flanges and the brake drum shown in Fig. 3.

The invention may obviously be applied to any form of vehicle wheel in so far as the construction of the peripheral portions of the wheel are concerned, but is particularly adapted for application to the wheels of motor vehicles, and the wheels of other vehicles and carriages that are designed to move over roads where special means for taking up shocks and jars between the tread portions of the wheel and the seats of the vehicle are required.

10 is the tire of a wheel which may be of cushioned type or any desired construction, and the reference character 11 designates the rim or felly to which the usual radiating spokes 12 are secured.

An essential feature of my invention is the provision of an enlarged hub housing, and the preferred manner of constructing such a housing is illustrated in the drawing Figs. 2 and 3, the same comprising the metallic cylinder 13, having preferably formed integrally therewith the right-angular peripheral flange 13$^a$. The flange 13$^a$ is provided obviously for the purpose of securing the inner extremities of the spokes 12, and the removable circular plate 14 is provided for coöperating with the cylindrical hub housing 13 and the flange portion 13$^a$ thereof, the parts 13$^a$ and 14 being clamped together by a plurality of retaining bolts 15′ passed through perforations in the respective parts 13$^a$ and 14, and secured in position clamping the spokes 12 firmly therebetween by the nuts 15$^a$ threaded on the free ends thereof. 15 is a floating hub or axle bushing adapted to take the axle or spindle of the vehicle, which latter is not herein shown, as it obviously forms no part of the invention. The floating hub or axle bushing 15 is of cylindrical form, and is positioned within the enlarged hub housing, with its extremities protruding beyond the sides of the housing in the manner shown most clearly in Fig. 3.

A circular plate as indicated by the reference character 16 is mounted near one extremity of the floating hub or axle bushing 15, and is preferably, although not necessarily, formed integrally therewith, as shown in the drawing, Fig. 3. In order to properly cushion the axle spindle designed to be supported within the floating hub or axle bushing 15, it is desirable that relative movement between the part 15 and the hub housing be provided for under the control of the elastic means presently to be described. This elastic means, comprising a plurality of springs, is contained within the peripheral space around the floating hub or axle bushing and on the interior of the hub housing. The plate 16 integral with the floating hub or axle bushing 15 forms a convenient means for the attachment thereto of the ordinary brake-drum which is shown in Fig. 3, and indicated by the reference character 17. This brake-drum may be utilized as shown in Fig. 3, as a part of the means for inclosing the housing for the elastic means, the wall of the same extending upwardly to a point beyond the hub housing 13. There may be a slight shoulder or off-set portion formed, as indicated in Fig. 3, on the floating hub or axle bushing, which serves as a ledge or support for the circular plate 18 which is used to close the spring housing on the side opposite the brake-drum and the flange 16. A convenient means of securing the inclosing plate 18 and the brake-drum 17 to the floating hub or axle bushing 15 consists of bolts 19, having reduced extremities at both ends, and being screw-threaded, whereby they may pass at one end through a suitable opening in the plate 16 (see Figs. 3 and 8) into a coöperating threaded opening in the wall of the brake-drum 17, thus securing the brake-drum 17 to the floating hub or axle bushing 15. At its opposite extremity, each of the bolts 19 will pass through suitable openings or perforations in the plate 18, and will be secured to said plate by nuts 19$^a$ screw-threaded on the extremities thereof. In order to resiliently support the floating hub or axle bushing in relation to the hub housing which is rigidly secured to the wheel proper, I interpose a plurality of helical springs of special form and construction, made of a good grade of spring wire or steel, and in the manner shown in detail in Figs. 4 and 5. These springs are indicated generally by the reference character 30 and are each formed preferably of a single length of metal spring stock generally round in cross-section, and having a coil or loop, as indicated at 30$^a$ formed intermediate its extremities. This coil or loop 30$^a$ is designed to support each of the springs 30 securely in relation to the floating hub or axle bushing 15 by encircling the flange bolts 19. The two extremities of the springs 30 are formed with short right-angular projections or trunnions as indicated at 30$^b$, these right-angular projections being adapted for insertion into pierced openings in lugs 21 formed on the inner periphery of the enlarged hub housing 13. In the material between the angular extremities 30$^b$ of the springs 30 and the coil 30$^a$ are preferably formed spirals or helices, having a suitable number of coils, as indicated, for example, by the coils 30$^c$. (See Figs. 4 and 5.) This construction gives these springs great resiliency, and elasticity, and by tending to resist crystallization renders breakage from sudden shocks and jars of rare occurrence, absorbing such without imparting the same violently to the floating hub or axle bushing 15. The pierced lugs 21 are preferably formed a little less in width than the space between the plates 16 and 18, so as not to interfere with the insertion of the angular ends of the springs therein, and allowing clearance and free movement of the parts.

As shown in Figs. 1 and 2, in the assembly of the wheel, there will obviously be as many of the bolts 19 as there are individual springs 30, and the loops or coils 30$^a$ of each will be passed over the body of the corresponding supporting bolt 19. In the form of the invention illustrated in the drawings, provision is made for the use of six of the complete helical springs 30, which makes a convenient construction, and provides sufficient elasticity or resiliency to give excellent results. It will be apparent, however, that the number of such springs employed, and their relative dimensions, as well as the relative dimensions of the various wheel parts may be modified to adapt the use of the invention to a great variety of conditions.

In the installation of the helical springs 30, as shown in Figs. 1 to 3 inclusive, it will be noted that each of the six springs used in the wheel is alike in construction, but alternate springs are reversed with respect to the direction of the projecting extremities 30$^b$ in order that alternate springs may coöperate with the adjacent supporting lugs 21 of the hub housing 13. (Figs. 2 and 7.)

The manner in which the wheel operates will be obvious from the description of its construction, for it will be seen that the floating hub or axle bushing 15 designed to support the spindle or axle of the car or vehicle, will be free to move in relation to the wheel body under the control of the helical springs 30, and that the wheel proper, including the enlarged hub housing rigidly connected therewith may have a great variety of movements, which will be absorbed by the elastic means comprising the helical springs 30 and their connections.

By my improved construction the elastic means is located in a small compact space near the center of the wheel and away from immediate contact with dirt, mud and corroding or abrasive elements that are always present when elastic or resilient means is attempted to be provided in the tire or the peripheral portions of the wheel. To assist in excluding injurious foreign particles from the housing for the elastic means near the center of the wheel, I provide improved means, shown in the drawings, Figs. 1 to 3 inclusive, and in Fig. 6, and from which it will be seen that the flange plates 13$^a$ and 14 are provided with peripheral grooves adjacent the plate 18, and the inner wall of the brakedrum 17. These grooves are of special construction as shown in the sectional view Fig. 6, comprising a widened portion 13$^b$ and a contracted portion 13$^c$, the former containing preferably a metallic ring adapted to rest near the bottom of the groove 13 with a peripheral ring of felt or other elastic dust excluding material, as indicated by the reference character 40 Fig. 6. The metal ring referred to, which is behind the felt 40 is designated by the reference character 41, Fig. 6, and in order to insure that the dust excluding ring 40 shall be operative at all times, helical steel springs 43 are mounted in the groove 13$^c$ and tend normally to press the metal rings 41 and the dust rings 40 against the walls of the drum and the plate 18, forming dust-tight joints therewith, but permitting at the same time perfect freedom of movement so as not to interfere with the resilient suspension of the floating hub or axle bushing in relation to the wheel, and the enlarged hub housing thereon.

To serve as a protective means for the helical springs when the brakes are suddenly applied, or sudden and unusual strains are brought upon the springs under other conditions, I provide coöperating lugs between the hub housing and the hub or axle bushing, consisting preferably of lugs as indicated by the reference character 60, 61 on flange plate 14 of the hub housing spaced apart and adapted to coöperate with lugs as indicated at 62 on the floating hub plate 18. This construction, it will be seen, permits freedom of movement between the hub or axle bushing and the hub housing within the limits desired for the cushioning effect but at the same time will prevent injury to the resilient means before it has reached the limit of its elasticity. This obviously is of much importance when the hub bushings 15 are used as a part of the driving wheels of the car by being rigidly connected to the driving axle and hence being subjected to driving strains imparted by the motive power and strains due to the application of braking means to the axles or to the brake drums, as shown at 17, when the car is in motion.

In order that the invention might be understood, details of the preferred embodiment thereof have been set forth with particularity, but it is not desired to be limited to the exact details shown and described, for it will be apparent that persons skilled in this art may vary such construction without departing from the purpose and spirit of the invention.

I claim:

1. In a resilient wheel, the combination of a hub housing, an axle bushing in and substantially concentric with the hub housing, flanges on the axle bushing and coöperating with the ends of the hub housing inclosing an annular space between the hub housing and axle bushing, bolts extending through the flanges substantially parallel with the axis of the axle bushing, inwardly extending lugs spaced apart around the inner surface of the hub housing, each lug having a perforation therein substantially parallel with the axis of the hub housing, and wire springs each having its central portion disposed in a loop and engaging one of said bolts and its end portions disposed in the perforations of two of the adjacent lugs on the interior of the hub housing.

2. In a resilient wheel, the combination of a hub housing, an axle bushing in and substantially concentric with the hub housing, flanges on the axle bushing and engaging the ends of the hub housing inclosing an annular space between the hub housing and axle bushing, bolts extending through the flanges substantially parallel with the axis of the axle bushing, inwardly extending lugs on the inner surface of the hub housing, each lug being shorter than the length of the hub housing and having a perforation therein parallel with the axis of the hub housing, and wire springs disposed around the annular space between the hub housing and the axle bushing each spring having its central portion engaging one of the bolts and its ends bent and disposed in the perforations of two of said lugs, said flanges serving to hold the end portions of the springs in said lugs.

3. In a resilient wheel, the combination of a hub housing, spokes and a felly supported thereby, an axle bushing in and substantially concentric with the hub housing, flanges on the axle bushing engaging the ends of the hub housing to inclose an annular space between the hub housing and axle bushing, bolts extending through the flanges substantially parallel with the axis of the axle bushing with their body portions spaced apart within the hub housing, inwardly extending lugs on the inner surface of the hub housing, each lug being shorter than the distance between the end plates or flanges of the hub housing and having each a perforation therein parallel with the axis of the hub housing, and wire springs disposed around the annular space between the hub housing and the axle bushing, each spring having its central portion coiled around one of the said bolts and with its terminals bent and disposed in the perforations of two adjacent spaced lugs, said flanges being adapted to prevent withdrawal of the end portions or trunnions from said lugs and said springs being arranged peripherally around the said hub housing so that terminals of adjacent springs enter each of the perforations in said lugs from the opposite ends thereof.

4. In a resilient wheel, the combination of a hub housing, an axle bushing in and substantially concentric with the hub housing, flanges on the axle bushing coöperating with the ends of the hub housing inclosing an annular space between the hub housing and the axle bushing, bolts extending through the flanges substantially parallel with the axis of the axle bushing, radial inwardly extending lugs spaced apart on the interior surface of the hub housing, each lug having a perforation therein substantially parallel with the axis of the hub, and a spring comprising an integral rod or bar of spring metal formed at its terminals with trunnions extending angularly to the adjacent body portions of the spring and being adapted to coöperate with the perforations in said spaced lugs, there being a coil or helix of a single loop formed intermediate the said angularly extending trunnions, said loop being adapted to encircle said bolts extending through and between said flanges; and helices or coils containing a plurality of loops formed intermediate the first said single loop coil or helix and said terminal trunnions.

5. In a resilient wheel, the combination of a hub housing, an axle bushing in and substantially concentric with the hub housing, flange plates on the axle bushing spaced apart and arranged to coöperate with the ends of the hub housing for inclosing an annular space between the hub housing and the axle bushing, a plurality of bolts extending between the said flanges with their terminals anchored in said flanges and being spaced peripherally around the axle bushing within said housing, each of said bolts being provided with terminals of less diameter than the body portions thereof thereby providing shoulders for engaging the said flanges on the axle bushing, a plurality of spaced lugs on the interior periphery of the housing, each lug having a perforation therein substantially parallel with the axis of the wheel, and a plurality of springs each comprising an integral rod or bar of spring metal formed at its terminals with trunnions extending angularly to the adjacent body portions of the spring, the said trunnions being disposed in the perforations of said lugs, a coil or helix formed intermediate the said angularly extending trunnions of the spring and surrounding the body portions of the said bolts and being held in position thereby on the interior of the housing, there being helices or coils of a plurality of loops formed intermediate the first said coil or helix and said trunnions, the last said coils or helices being free to move bodily during the variable movements of the branches of the springs between said bolts and trunnions.

6. In a resilient wheel, the combination with a floating axle bushing, of spaced flange plates carried thereby and rotatable therewith and forming part of a closed hub housing, the peripheral portion of said hub housing consisting of a channeled split ring divided circumferentially near one of the side flanges of the channel into two separable parts, one of the parts of said channeled split ring being provided with perforated lugs extending inwardly therefrom for the securement of springs thereto, lugs or projections formed on the other of said divided portions of the said channeled split ring, and coöperating lugs on one of the adjacent flange plates of the axle bushing, arranged to insure a positive connection between the peripheral parts of the hub housing and the parts connected to the axle bushing before the possible strain on the elastic means tying the axle bushing to the wheel has been brought to or beyond its elastic limit.

7. In a resilient wheel, the combination of a hub housing, an axle bushing in said hub housing, flange plates on the axle bushing spaced apart and arranged to coöperate with the ends of the hub housing for inclosing an annular space between the hub housing and the axle bushing, a plurality of bolts extending between the said flange plates with their terminals anchored therein and being spaced peripherally around the axle bushing within said housing, a plurality of spaced lugs on the inner periphery of the housing, each lug having a perforation therein substantially parallel with the axis of the wheel, and a plurality of springs each comprising an integral rod or bar of spring metal formed at its terminals with trunnions extending angularly to the adjacent body portions of the spring, the said trunnions being disposed in the perforations of said lugs, a coil or helix formed intermediate the said angularly extending trunnions of the spring, and surrounding the body portions of the said bolts and being held in position thereby on the interior of the housing, there being helices or coils cylindrical in form and comprising a plurality of loops formed intermediate the first said coil or helix and the said trunnions, the last said coils or helices being free to move bodily during the variable movements of the branches of the springs between said bolts and trunnions.

In testimony whereof I have signed my name to this specification, in the presence of two subscribing witnesses, on this 14th day of October A. D. 1914.

LESLIE HARRINGTON.

Witnesses:
CHARLES H. SEEM,
A. L. SPRINKLE.

Copies of this patent may be obtained for five cents each, by addressing the "Commissioner of Patents, Washington, D. C."